(12) United States Patent
Aslanov et al.

(10) Patent No.: US 10,877,243 B2
(45) Date of Patent: Dec. 29, 2020

(54) F-THETA LENS HAVING DIFFRACTIVE OPTICAL ELEMENT AND OPTICAL SYSTEM INCLUDING THE F-THETA LENS

(71) Applicant: SAMSUNG DISPLAY CO., LTD., Yongin-si (KR)

(72) Inventors: Emil Aslanov, Yongin-si (KR); Alexander Voronov, Yongin-si (KR); Gyoo Wan Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 119 days.

(21) Appl. No.: 16/114,712

(22) Filed: Aug. 28, 2018

(65) Prior Publication Data

US 2019/0187416 A1 Jun. 20, 2019

(30) Foreign Application Priority Data

Dec. 15, 2017 (KR) .................. 10-2017-0172943

(51) Int. Cl.
*G02B 26/08* (2006.01)
*G02B 26/10* (2006.01)
(Continued)

(52) U.S. Cl.
CPC ...... *G02B 13/0005* (2013.01); *B23K 26/0624* (2015.10); *B23K 26/0648* (2013.01);
(Continued)

(58) Field of Classification Search
CPC ............ B23K 26/0648; B23K 26/0624; B23K 26/0652; B23K 26/38; B23K 26/08; G02B 26/10; G02B 26/106; G02B 26/125; G02B 26/128; G02B 27/0025; G02B 27/0031; G02B 27/0037; G02B 27/48; G02B 27/4211; G02B 27/4216; G02B 27/4227; G02B 13/0005; G02B 13/22; G02B 5/18; G02B 5/1876; G02B 5/1895; G02B 5/3083; G02B 3/00; G02B 1/00; G02B 27/0081; G02B 27/0172; G02B 27/0176;
(Continued)

(56) References Cited

U.S. PATENT DOCUMENTS 5,838,480 A 11/1998 Mcintyre et al.
6,067,106 A * 5/2000 Ishibe ............... G02B 5/1895
347/258
(Continued)

FOREIGN PATENT DOCUMENTS

DE 202012003086 U1 7/2012
JP 2008501534 A 1/2008
(Continued)

OTHER PUBLICATIONS

Jose Sasian, Diffractive Optical Elements, 53 Pages, College of Optical Sciences, Mar. 2016.

*Primary Examiner* — Mustak Choudhury
(74) *Attorney, Agent, or Firm* — Cantor Colburn LLP (57) ABSTRACT

An F-theta lens includes a diffractive optical element and a plurality of spherical lenses. The diffractive optical element includes multi-level diffractive structure having three or more levels and defined on a surface thereof, and the diffractive optical element is arranged before the spherical lenses on a path of a laser beam.

16 Claims, 9 Drawing Sheets

(51) Int. Cl.
*G02B 26/12* (2006.01)
*G02B 13/00* (2006.01)
*G02B 27/00* (2006.01)
*G02B 27/42* (2006.01)
*B23K 26/06* (2014.01)
*B23K 26/0622* (2014.01)
*B23K 26/38* (2014.01)
*B23K 26/08* (2014.01)
*G02B 13/22* (2006.01)

(52) U.S. Cl.
CPC .......... *B23K 26/0652* (2013.01); *B23K 26/08* (2013.01); *B23K 26/38* (2013.01); *G02B 27/0031* (2013.01); *G02B 27/4211* (2013.01); *G02B 27/4227* (2013.01); *G02B 13/22* (2013.01)

(58) Field of Classification Search
CPC ............ G02B 27/4205; G02B 27/4238; G02B 27/4261; G01J 3/18; G01J 3/2803; G01J 3/0208; G01J 3/0294; G01B 9/02039; G01B 9/02057; G11B 7/1353; G11B 7/1372; G11B 7/1374
See application file for complete search history.

(56) References Cited

U.S. PATENT DOCUMENTS

| | | | |
|---|---|---|---|
| 7,020,379 B2 | 3/2006 | Lee | |
| 8,879,171 B2 | 11/2014 | Wunderlich et al. | |
| 9,442,272 B2 | 9/2016 | Wunderlich | |
| 2002/0015232 A1* | 2/2002 | Nakai | G02B 5/1866 359/569 |
| 2003/0174374 A1* | 9/2003 | Takeuchi | G02B 26/125 359/196.1 |
| 2008/0095968 A1 | 4/2008 | Semon | |
| 2013/0107360 A1* | 5/2013 | Kurtz | G02B 1/00 359/434 |

FOREIGN PATENT DOCUMENTS

| | | |
|---|---|---|
| KR | 100405660 B1 | 11/2003 |
| KR | 100917881 B1 | 9/2009 |
| KR | 101180705 B1 | 9/2012 |
| KR | 2020160001818 U | 5/2016 |

\* cited by examiner

F-THETA LENS HAVING DIFFRACTIVE OPTICAL ELEMENT AND OPTICAL SYSTEM INCLUDING THE F-THETA LENS

This application claims priority to Korean patent application 10-2017-0172943, filed on Dec. 15, 2017, and all the benefits accruing therefrom under 35 U.S.C. § 119, the content of which in its entirety is herein incorporated by reference.

BACKGROUND

1. Field

Embodiments of the disclosure relate to an F-theta lens and an optical system including the F-theta lens, and more particularly, to an F-theta lens including a diffractive optical element, and an optical system including the F-theta lens.

2. Related Art

Currently, a processing method using a laser beam is widely used for processing substrates used in various electronic devices such as a display panel. When a substrate is processed by an ultrashort pulse laser beam having an ultrashort pulse duration such as a femtosecond laser beam, the substrate may be processed before the energy of the laser beam is converted into heat. Therefore, it is possible to prevent the substrate from being damaged by heat.

SUMMARY

In a processing using an ultrashort pulse laser beam having an ultrashort pulse duration, and as the pulse duration of the laser beam becomes shorter, the spectral bandwidth increases such that the laser beam may not be effectively focused at an exact target spot on a focal plane of an object to be processed. In addition, a plurality of optical elements may be arranged or combined together to accurately focus the laser beam at the target spot such that the structure of the optical system may become complicated.

Embodiments of the disclosure relate to an F-theta lens and an optical system including the F-theta lens which focus a femtosecond laser beam into a diffraction limited spot with high accuracy while having a relatively simple structure.

An embodiment of an F-theta lens includes a diffractive optical element and a plurality of spherical lenses. In such an embodiment, the diffractive optical element includes a multi-level diffractive structure having three or more levels and defined on a surface thereof, and the diffractive optical element is arranged before the spherical lenses on a path of a laser beam.

According to an embodiment, each of the diffractive optical element and the spherical lenses may include fused silica.

According to an embodiment, the diffractive optical element may include a front surface and a rear surface, each of which is a plane surface, and the diffractive structure may be defined on the rear surface.

According to an embodiment, the diffractive structure may have an axisymmetric structure including a plurality of rings.

According to an embodiment, the diffractive structure may be an 8-level diffractive structure.

According to an embodiment, a ratio of a focal length of the diffractive optical element to a focal length of the F-theta lens may be 1.5 or greater.

According to an embodiment, the spherical lenses may include a first lens which is a plano-concave lens, a second lens which is a meniscus lens, a third lens which is a concave-convex lens, and a fourth lens which is a convex-convex lens, and the first to fourth lenses may be sequentially arranged after the diffractive optical element on the path of the laser beam.

According to an embodiment, respective ratios of respective focal lengths of the diffractive optical element and the first to fourth lenses with respect to a focal length of the F-theta lens may satisfy, with a tolerance of 5%, the following conditions: $f_{DOE}/f_{F\text{-}theta}=2.1$; $f_1/f_{F\text{-}theta}=-1.76$; $f_2/f_{F\text{-}theta}=-3.44$; $f_3/f_{F\text{-}theta}=1.46$; and $f_4/f_{F\text{-}theta}=2.09$, where $f_{DOE}$ denotes a focal length of the diffractive optical element, $f_{F\text{-}theta}$ denotes the focal length of the F-theta lens, $f_1$ denotes a focal length of the first lens, $f_2$ denotes a focal length of the second lens, $f_3$ denotes a focal length of the third lens, and $f_4$ denotes a focal length of the fourth lens.

An embodiment of an optical system includes a laser generator which emits a laser beam, a scanner which adjusts a direction in which the laser beam is directed, and an F-theta lens including a diffractive optical element and a plurality of spherical lenses sequentially arranged after the scanner on a path of the laser beam. In such an embodiment, the diffractive optical element includes a multi-level diffractive structure having three or more levels and defined on a surface thereof.

According to an embodiment, each of the diffractive optical element and the spherical lenses may include fused silica.

According to an embodiment, the diffractive optical element may include a front surface and a rear surface, each of which is a plane surface, and the diffractive structure may be defined on the rear surface.

According to an embodiment, the diffractive structure may have an axisymmetric structure including a plurality of rings.

According to an embodiment, the diffractive structure may be an 8-level diffractive structure.

According to an embodiment, a ratio of the focal length of a diffractive optical element to a focal length of the F-theta lens may be 1.5 or greater.

According to an embodiment, the spherical lenses may include a first lens which is a plano-concave lens, a second lens which is a meniscus lens, a third lens which is a concave-convex lens, and a fourth lens which is a convex-convex lens, and the first to fourth lenses may be sequentially arranged after the diffractive optical element on the path of the laser beam.

According to an embodiment, respective ratios of respective focal lengths of the diffractive optical element and the first to fourth lens with respect to a focal length of the F-theta lens may satisfy, with a tolerance of 5%, the following conditions: $f_{DOE}/f_{F\text{-}theta}=2.1$; $f_1/f_{F\text{-}theta}=-1.76$; $f_2/f_{F\text{-}theta}=-3.44$; $f_3/f_{F\text{-}theta}=1.46$; and $f_4/f_{F\text{-}theta}=2.09$, where $f_{DOE}$ denotes the focal length of the diffractive optical element, $f_{F\text{-}theta}$ denotes the focal length of the F-theta lens, $f_1$ denotes a focal length of the first lens, $f_2$ denotes a focal length of the second lens, $f_3$ denotes a focal length of the third lens, and $f_4$ denotes a focal length of the fourth lens.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1:
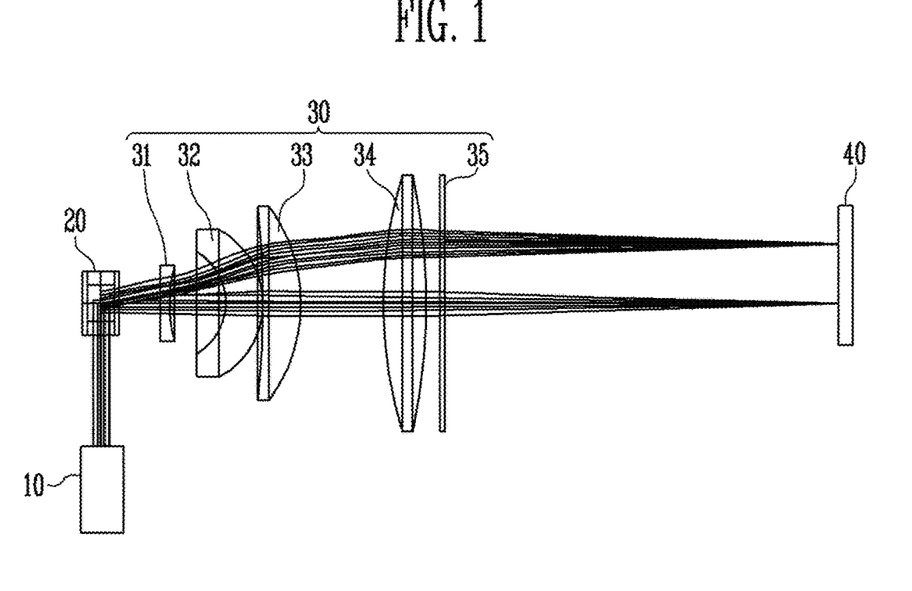
FIG. 1 illustrates an F-theta lens and an optical system including the F-theta lens according to an embodiment of the disclosure.

FIG. 1 illustrates an F-theta lens and an optical system including the F-theta lens according to an embodiment of the disclosure. According to an embodiment, the F-theta lens may be a telecentric F-theta lens, especially, an ultraviolet ("UV") F-theta lens. A telecentric F-theta lenses may be used for laser cutting or drilling. In general, an optical system (or an optical scanning system) includes a laser source, a beam expander and a galvanometer.

Referring to FIG. 1, an embodiment of the optical system may include a laser generator 10, a scanner (or, a galvanometer) 20 and an F-theta lens 30. An object to be processed, such as a substrate 40, may be disposed at a position where a laser beam generated in the laser generator 10 and having passed through the scanner 20 and the F-theta lens 30 may reach.

The laser generator 10 oscillates a laser to emit a laser beam. According to an embodiment, the laser generator 10 may emit a laser beam by oscillating an ultrashort pulse laser, for example, a femtosecond laser.

The scanner 20 may include at least one mirror, e.g., two mirrors The scanner 20 may adjust an angle of the mirror to adjust a direction in which a laser beam incident thereto from the laser generator 10 is directed.

In an embodiment, the F-theta lens 30 includes a plurality of spherical lenses sequentially arranged from the scanner 20. In such an embodiment, the spherical lenses may be disposed after the scanner 20. In such an embodiment, the F-theta lens 30 may further include a protection window 35 arranged behind (or, after) the spherical lenses. Herein, relative terms indicating an order or sequence of elements in the optical system, e.g., behind or after, may be determined based on the passage of the laser beam from the laser generator 10 in the optical system. Herein, for example, when a first element is arranged behind or after a second element, the laser beam passes through the first element after passed through the second element.

At least one surface of the spherical lenses may be a spherical surface having a concave or convex shape with a predetermined curvature. According to an embodiment, the spherical lenses may include a first lens 31, a second lens 32, a third lens 33, and a fourth lens 34 that are sequentially disposed behind (or after) the scanner 20.

According to an embodiment, the first lens 31 may be a plano-concave lens, and the second lens 32 may be a meniscus lens. The third lens 33 may be a concave-convex lens, and the fourth lens 34 may be a convex-convex lens (or double-convex lens).

In such an embodiment, the F-theta lens 30 and the optical system including the F-theta lens 30 appropriately operate for a picosecond laser to scan or focus a picosecond laser beam onto one surface, e.g., a focal plane, of the substrate 40. However, the F-theta lens 30 and the optical system including the F-theta lens 30 may cause or generate chromatic aberrations and exhibit a relatively low focusing efficiency for an ultrashort pulse laser such as a femtosecond laser.

Figure 2:
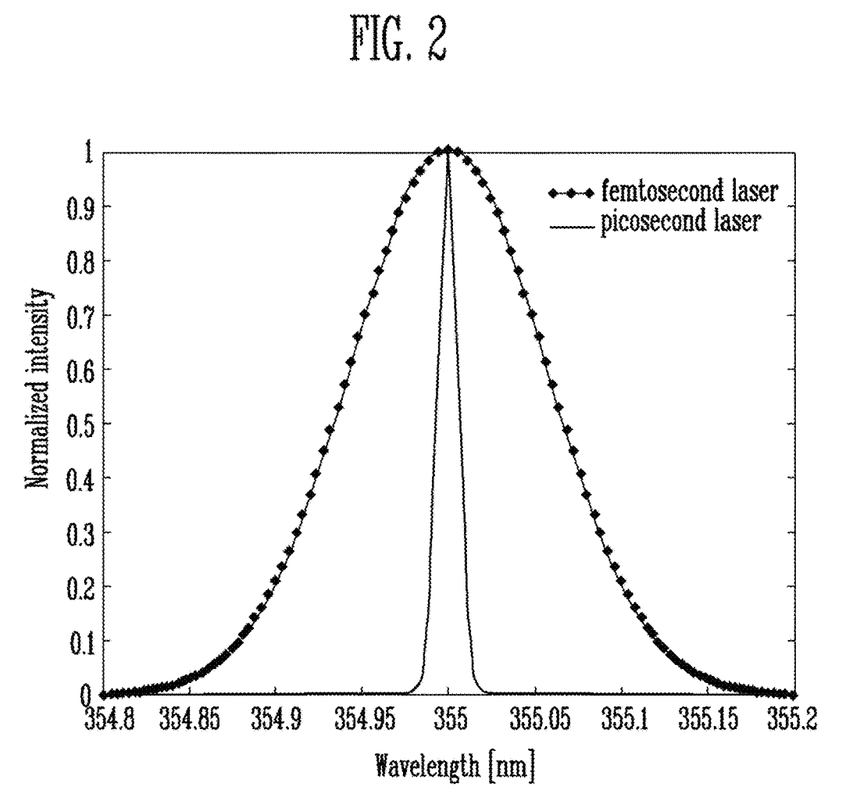
FIG. 2 illustrates the spectral bandwidth of a picosecond laser and a femtosecond laser.

Specifically, referring to FIG. 2 illustrating the spectral bandwidth of a picosecond laser and a femtosecond laser, a femtosecond laser has an extended spectral bandwidth as compared to a picosecond laser. When a laser beam is scanned by a femtosecond laser using the F-theta lens 30 and an optical system including the F-theta lens 30, chromatic aberration may occur and the focusing efficiency may be lowered. Accordingly, it may be difficult to obtain a desired processing effect.

Currently, the materials widely used to effectively fabricate lenses for powerful UV lasers, for example, about 30 watts (W) of UV lasers, are somewhat limited. Materials that may be used to fabricate lenses for such UV lasers may be limited to fused silica and calcium fluoride, for example. Therefore, it may be difficult to use a production method using different materials to compensate for the lateral color shift. In particular, calcium fluoride is difficult to treat and is not suitable for mass production of lenses. Thus, most of conventional lenses may include or be made of fused silica for mass production. Accordingly, in an embodiment of the invention, all of lenses of the F-theta lens 30, e.g., the first to fourth lenses 31 to 34, may include or be made of fused silica. In such an embodiment, the protection window 35 may also include or be made of fused silica. However, in such an embodiment of the F-theta lens 30, the lateral color shift for the femtosecond laser may be desired to be compensated.

Figure 3:
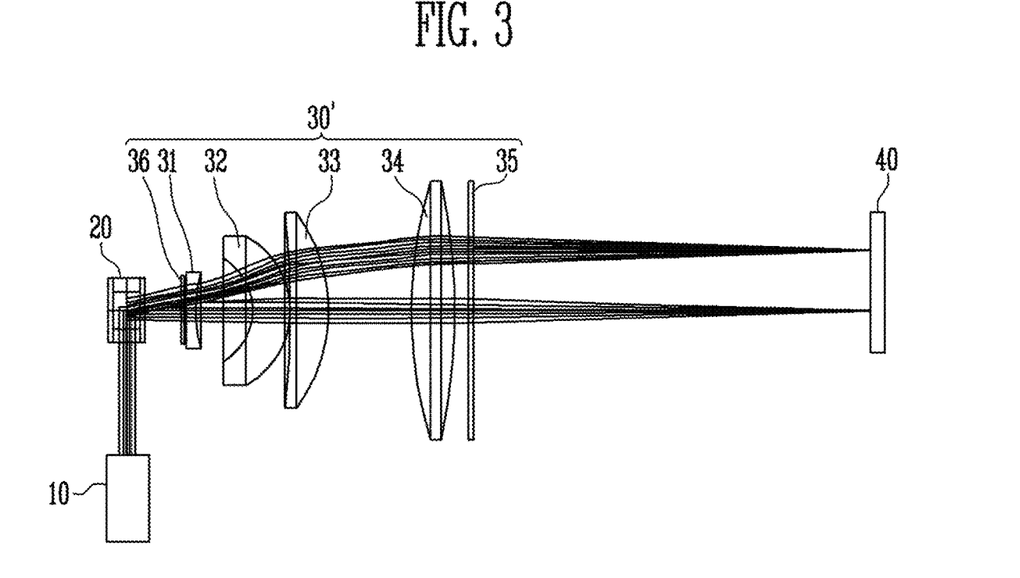
FIG. 3 illustrates an F-theta lens and an optical system including the F-theta lens according to an alternative embodiment of the disclosure.
Figure 4:
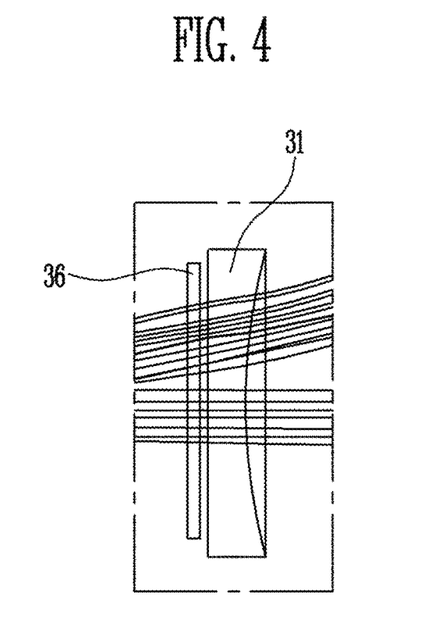
FIG. 4 is an enlarged view of one area of the F-theta lens shown in FIG. 3.

FIG. 3 illustrates an F-theta lens 30' and an optical system including the F-theta lens 30' according to an alternative embodiment of the disclosure. FIG. 4 illustrates an enlarged view of one area of the F-theta lens 30' shown in FIG. 3. In FIGS. 3 and 4, elements similar or identical to those in embodiments described above with reference to FIG. 1 are designated by the same or like reference numerals, and any repetitive detailed description thereof will be omitted.

Referring to FIGS. 3 and 4, an embodiment of the F-theta lens 30' further includes a diffractive optical element (also referred to as DOE) 36 disposed in front of (or before) the spherical lenses on the path of a laser beam. In such an embodiment, the F-theta lens 30' may include the diffractive optical element 36 and the plurality of spherical lenses (for example, the first to fourth lenses 31 to 34 sequentially arranged behind (or after) the diffractive optical element 36) sequentially arranged behind (or after) the scanner 20.

According to an embodiment, the diffractive optical element 36 may have a negative Abbe number and may include or be made of a same material as the other optical elements in the F-theta lens 30'. In one embodiment, for example, the diffractive optical element 36 may include or be made of fused silica. In such an embodiment, the diffractive optical element 36 may be a Fresnel lens. The diffractive optical element 36 may be arranged as a first element among the optical elements of the F-theta lens 30'. In such an embodiment, the optical element 36 may be disposed in front of (or before) the spherical lenses on the path of the laser beam. The diffractive optical element 36 may be used for chromatic aberration correction.

According to an embodiment, as described above, all of the optical elements (i.e., the diffractive optical element 36, the first to fourth lenses 31 to 34, and the protection window 35) of the F-theta lens 30' may include or be made of fused silica. Accordingly, such an embodiment of the F-theta lens 30' and the optical system may be widely used in various processing steps including laser processing using a strong UV laser beam.

In such an embodiment, chromatic aberration may be corrected for the femtosecond laser beam having a wide spectral bandwidth by correcting the chromatic aberration using the diffractive optical element 36, and the femtosecond laser beam may be focused into the diffraction limited spot with high efficiency. In such an embodiment, the size of the F-theta lens 30' may be reduced and the structure of the F-theta lens 30' may be simplified by arranging the diffractive optical element 36 among the optical elements of the F-theta lens 30' as the first element at the front end. In such an embodiment of the F-theta lens 30' and the optical system including the F-theta lens 30', chromatic aberration may be effectively corrected using a relatively simple structure.

Figure 5A:
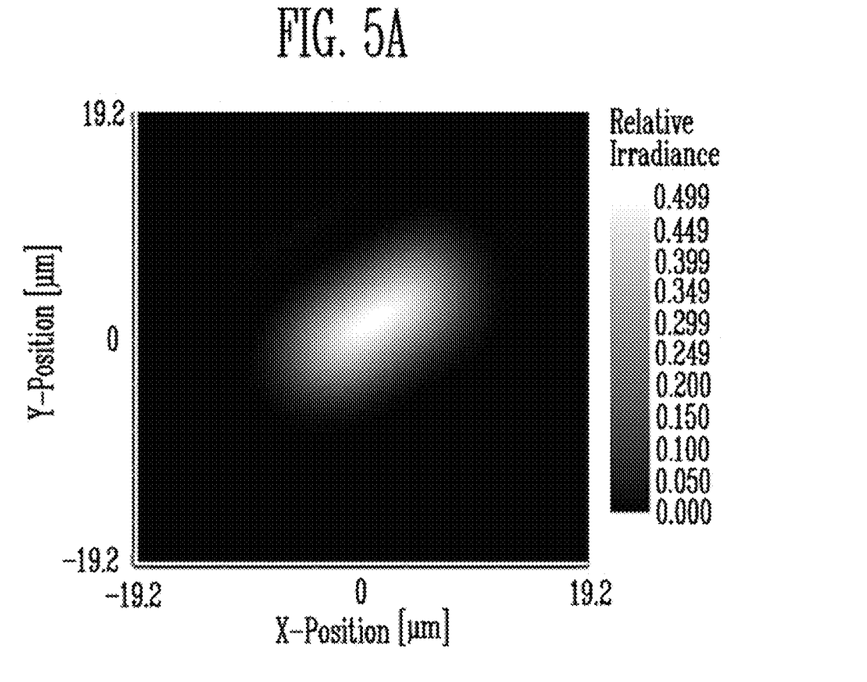
FIG. 5A illustrates the intensity distribution on a focal plane of a substrate with respect to the femtosecond laser when the F-theta lens of FIG. 1 is used.
Figure 5B:
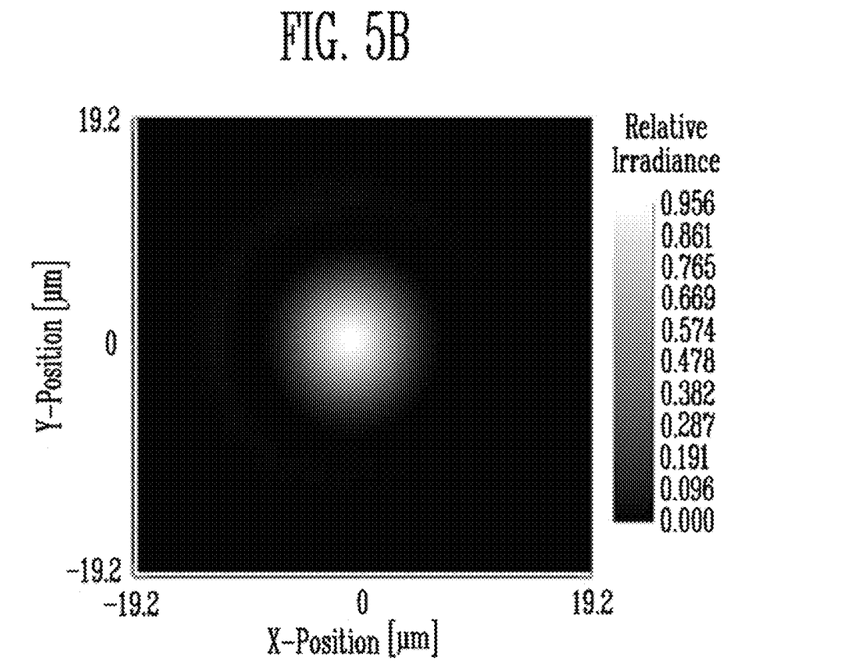
FIG. 5B illustrates the intensity distribution on the focal plane of the substrate with respect to the femtosecond laser when the F-theta lens of FIG. 3 is used.

FIG. 5A illustrates the intensity distribution on a focal plane of a substrate with respect to the femtosecond laser when the F-theta lens of FIG. 1 is used. FIG. 5B illustrates the intensity distribution on the focal plane of the substrate with respect to the femtosecond laser when the F-theta lens of FIG. 3 is used.

As shown in FIG. 5A, when the femtosecond laser beam is scanned or focused on the focal plane using an embodiment of the F-theta lens 30 of FIG. 1, chromatic aberration occurs on the focal plane, and the intensity distribution of the laser beam appears elliptical. As shown in FIG. 5B, when the femtosecond laser beam is scanned or focused on the focal plane using an embodiment of the F-theta lens 30' including the diffractive optical element 36 as shown in FIG. 3 the ellipticity of the laser beam generated by the chromatic aberration at the corner of the scanning area on the focal plane is corrected. In such an embodiment, chromatic aberration that may occur when an ultrashort pulse laser such as the femtosecond laser is used may be effectively corrected, and the laser beam may be focused at a desired target spot with high efficiency and/or accuracy.

Figure 6A:
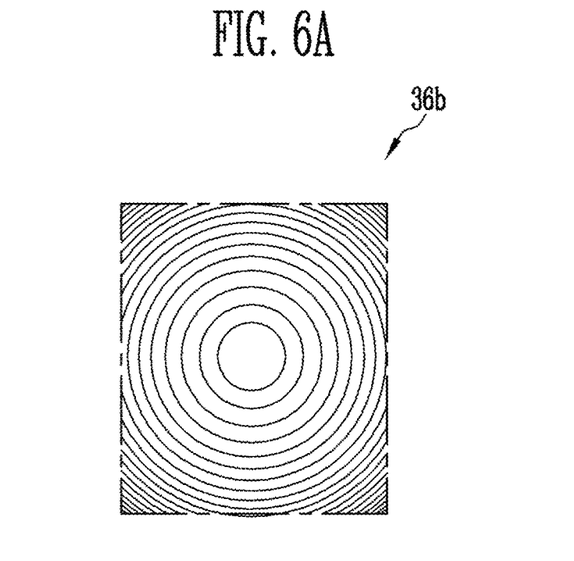
FIGS. 6A and 6B respectively are an enlarged plan view and an enlarged cross-sectional view of an area of the diffractive optical element shown in FIGS. 3 and 4.
Figure 6B:
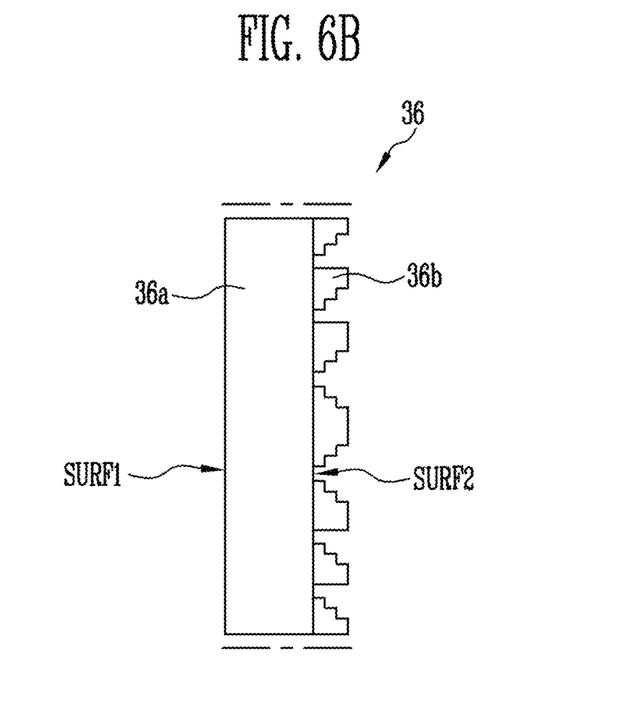
Figure 7:
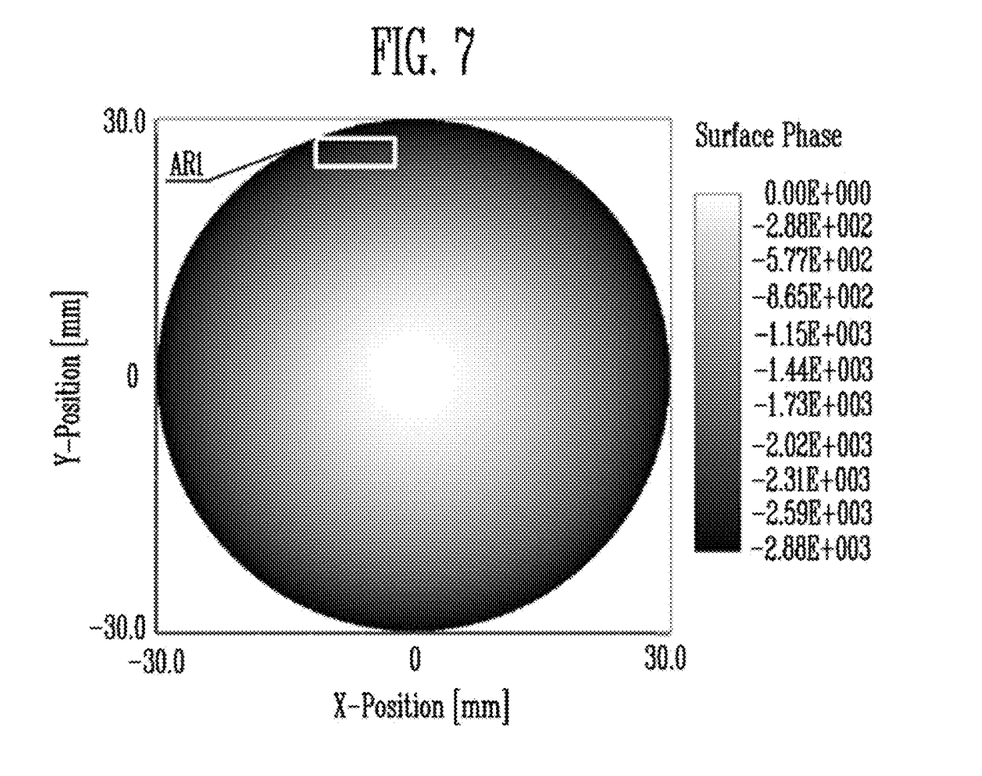
FIG. 7 illustrates a phase variation across a diffractive optical element according to an embodiment of the disclosure.

FIGS. 6A and 6B are an enlarged plan view and an enlarged cross-sectional view of one area of the diffractive optical element shown in FIGS. 3 and 4. FIG. 7 illustrates a phase variation across a diffractive optical element according to an embodiment of the disclosure, and specifically illustrates a distribution form of the rings distributed in the diffractive optical element. In FIG. 7, an area AR1 may be one area of the diffractive optical element having the maximum ring density.

Referring to FIGS. 6A to 7, an embodiment of the F-Theta lens 30' has an axisymmetric structure, and accordingly, the diffractive optical element 36 may also be fabricated (or manufactured) to have an axisymmetric structure. The diffractive optical element 36 may include a diffractive structure 36b disposed and/or formed on one surface of a flat plate 36a. In one embodiment, for example, the flat plate 36a of the diffractive optical element 36 includes a front surface SURF1 and a rear surface SURF2, each of which is a plane or flat surface, and the diffractive optical element 36 may include the diffractive structure 36b disposed or formed on at least one of the front surface SURF1 and the rear surface SURF2.

In one embodiment, for example, the diffractive optical element 36 may include the flat plate 36a including the front surface SURF1 and the rear surface SURF2, and the diffractive structure 36b formed on one of the front surface SURF1 and the rear surface SURF2 of the flat plate 36a.

In such an embodiment, where a diffraction pattern, such as the diffractive structure 36b, is formed on any one surface of the flat plate 36a, the diffraction pattern may be easily formed through a photo process or the like, and the diffraction pattern may be formed precisely.

According to an embodiment, the diffractive structure 36b may have an axisymmetric structure defined by a plurality of rings. In such an embodiment, the axisymmetric structure of the diffractive structure 36b may be fabricated in the form of rings. In an embodiment, each of the rings may change the wavefront phase by 2 pi ($\pi$).

In such an embodiment, the diffractive structure 36b may be defined at a front side or a rear side of the diffractive optical element 36. In one embodiment, for example, the diffractive structure 36b may be defined on one surface (i.e., the rear surface SURF2) facing the spherical lenses. In such an embodiment where the diffractive structure 36b is defined on the rear surface SURF2 shielded from the outside, the diffractive optical element 36 (particularly, the diffractive structure 36b) may be protected from contaminants such as dust, and the mechanical damage of the diffractive optical element 36 may be effectively prevented.

It may be difficult to obtain a continuous phase profile of the diffractive optical element 36. In an embodiment, the diffractive optical element 36 may be fabricated in a stepped structure. In one embodiment, for example, the diffractive optical element 36 may be fabricated in a binary structure, i.e., 2 levels. Hereinafter, the diffractive optical element of the binary structure will be referred to as a 2-level diffractive optical element. The efficiency (the amount of energy in the main order) (hereinafter, denoted by $\eta_1$) of the 2-level diffractive optical element may satisfy the following Equation 1.

$$\eta_1 = \left[\frac{\sin(\pi/N)}{\pi/N}\right]^2 \qquad \text{[Equation 1]}$$

In Equation 1, N denotes the number of layers. Accordingly, N is 2 in the binary structure of 2 levels. The efficiency $\eta_1$ of the 2-level diffractive optical element is only about 40%.

Accordingly, in an embodiment of the disclosure, the diffractive structure 36b may be formed in three or more levels. In such an embodiment, the diffractive optical element 36 may be a multi-level diffractive optical element including three or more levels of the multi-level diffractive structure 36b disposed on any one surface, e.g., the rear surface SURF2. In one embodiment, for example, the diffractive optical element 36 may be an 8-level diffractive optical element including the diffractive structure 36b of eight levels. In such an embodiment, where the diffractive optical element 36 is embodied as a multi-level diffractive optical element of three or more levels, an efficiency ($\eta_1$) may be about 60% or greater.

In terms of design, it may be desired to reduce the number of rings constituting the diffraction pattern, i.e., the diffractive structure 36b of the diffractive optical element 36 since it is difficult to fabricate a large number of rings. In this regard, in the embodiment of FIG. 7, the number of rings formed in the diffractive optical element 36 may be approximately 3000.

In order to optimize the design of the F-theta lens 30' and the optical system including the F-theta lens 30' according to an embodiment, it is desired to maintain the focal length of the diffractive optical element 36 at the effective focal length EFL of the F-theta lens 30' or more. Thus, in an embodiment, the ratio of the focal length $f_{DOE}$ of the diffractive optical element 36 to the focal length $f_{F\text{-}theta}$ of the F-theta lens 30' may be set or designed to be about 1.5 or greater. (i.e., $f_{DOE}/f_{F\text{-}theta} \geq 1.5$)

Figure 8A:
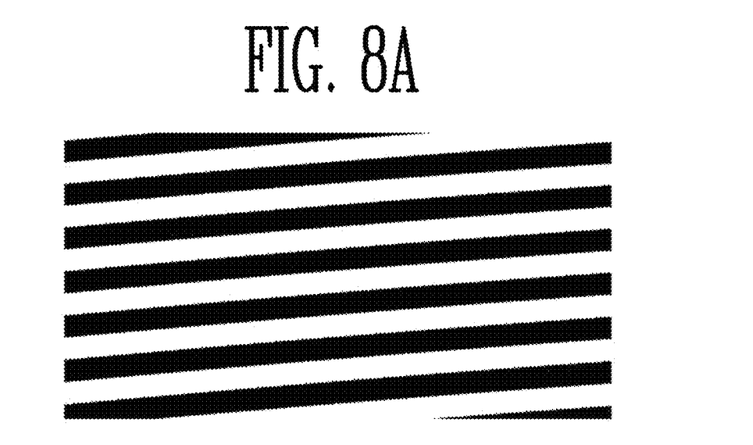
FIG. 8A illustrates a phase variation across an area AR1 of FIG. 7 when a 2-level diffractive optical element is used.
Figure 8B:
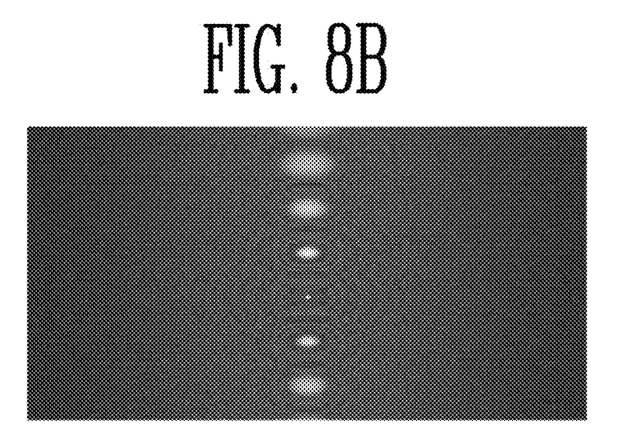
FIG. 8B illustrates the intensity distribution on a focal plane of a substrate for a laser beam passing through the 2-level diffractive optical element of FIG. 8A.
Figure 8C:
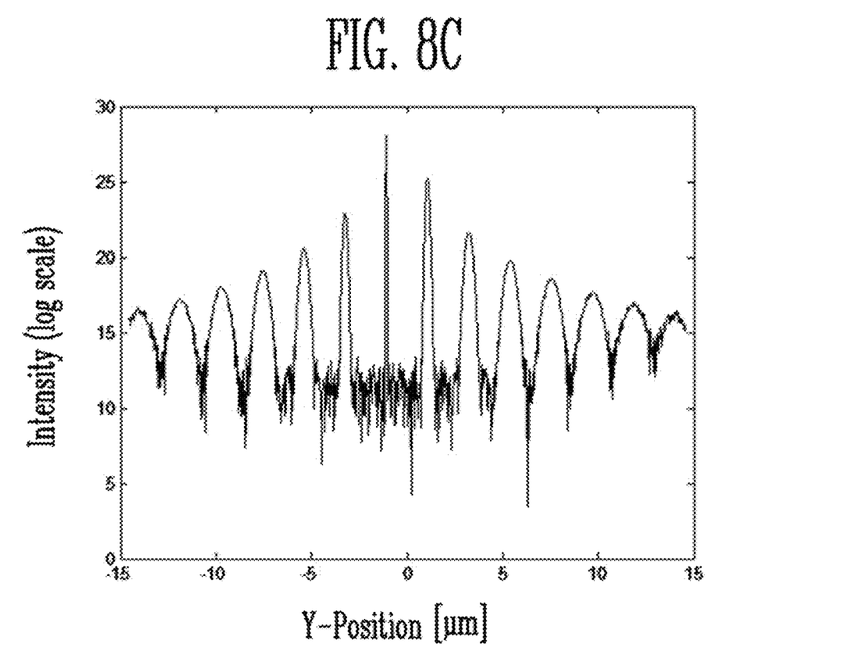
FIG. 8C illustrates the intensity distribution on the focal plane of the substrate for the laser beam passing through the 2-level diffractive optical element of FIG. 8A according to the Y-coordinate on a specific X-coordinate.

FIG. 8A illustrates a phase variation across the area AR1 of FIG. 7 when a 2-level diffractive optical element is used. FIG. 8B illustrates the intensity distribution on a focal plane of a substrate for a laser beam passing through the 2-level diffractive optical element of FIG. 8A. FIG. 8C illustrates the intensity distribution on the focal plane of the substrate for the laser beam passing through the 2-level diffractive optical element of FIG. 8A according to the Y-coordinate on a specific X-coordinate. More particularly, FIG. 8C illustrates the intensity distribution on the focal plane according to the Y-coordinate at the position where the X-coordinate is zero.

Figure 9A:
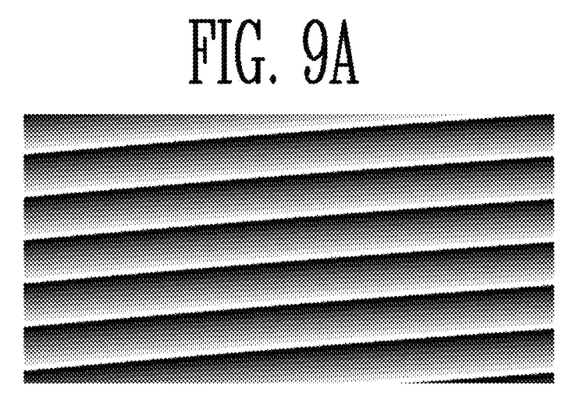
FIG. 9A illustrates a phase variation across the area AR1 of FIG. 7 when an 8-level diffractive optical element according to an embodiment is used.
Figure 9B:
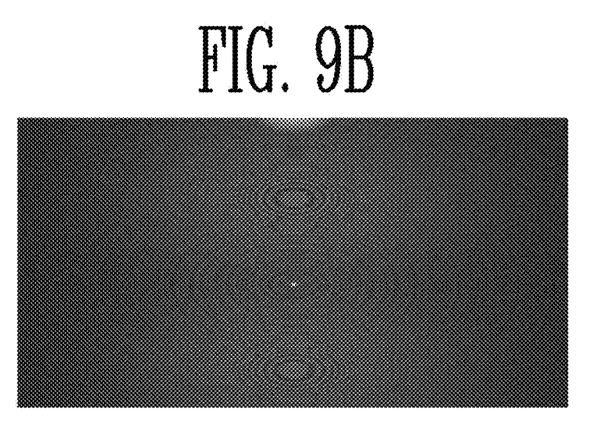
FIG. 9B illustrates the intensity distribution on the focal plane of the substrate for a laser beam passing through the 8-level diffractive optical element of FIG. 9A.
Figure 9C:
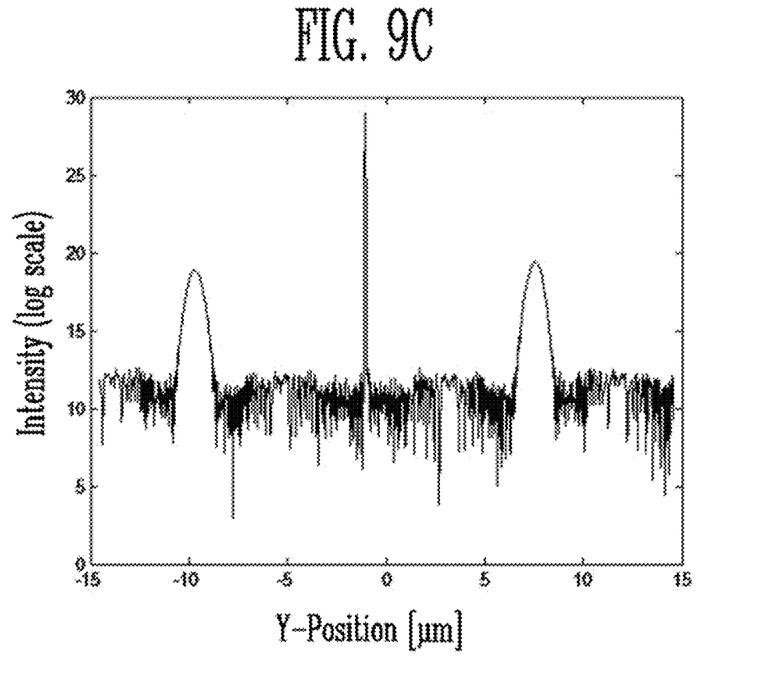
FIG. 9C illustrates the intensity distribution on the focal plane of the substrate for the laser beam passing through the 8-level diffractive optical element of FIG. 9A according to the Y-coordinate on a specific X-coordinate.

FIG. 9A illustrates a phase variation across the area AR1 of FIG. 7 when an 8-level diffractive optical element according to an embodiment is used. FIG. 9B illustrates the intensity distribution on the focal plane of the substrate for a laser beam passing through the 8-level diffractive optical element of FIG. 9A. FIG. 9C illustrates the intensity distribution on the focal plane of the substrate for the laser beam passing through the 8-level diffractive optical element of FIG. 9A according to the Y-coordinate on a specific X-coordinate. More particularly, FIG. 9C illustrates the intensity distribution on the focal plane according to the Y-coordinate at the position where the X-coordinate is zero.

Referring to FIGS. 8A to 8C and FIGS. 9A to 9C, when a laser beam, e.g., a femtosecond laser beam, is irradiated onto the focal plane using the 8-level diffractive optical element, the laser beam may be focused onto a target spot with higher accuracy and efficiency as compared to the case where the 2-level diffractive optical element is used.

In an embodiment, where the diffractive optical element 36 is embodied as the 8-level diffractive optical element, the ratio of main order intensity to parasitic orders may be about 10000 or more.

Figure 10:
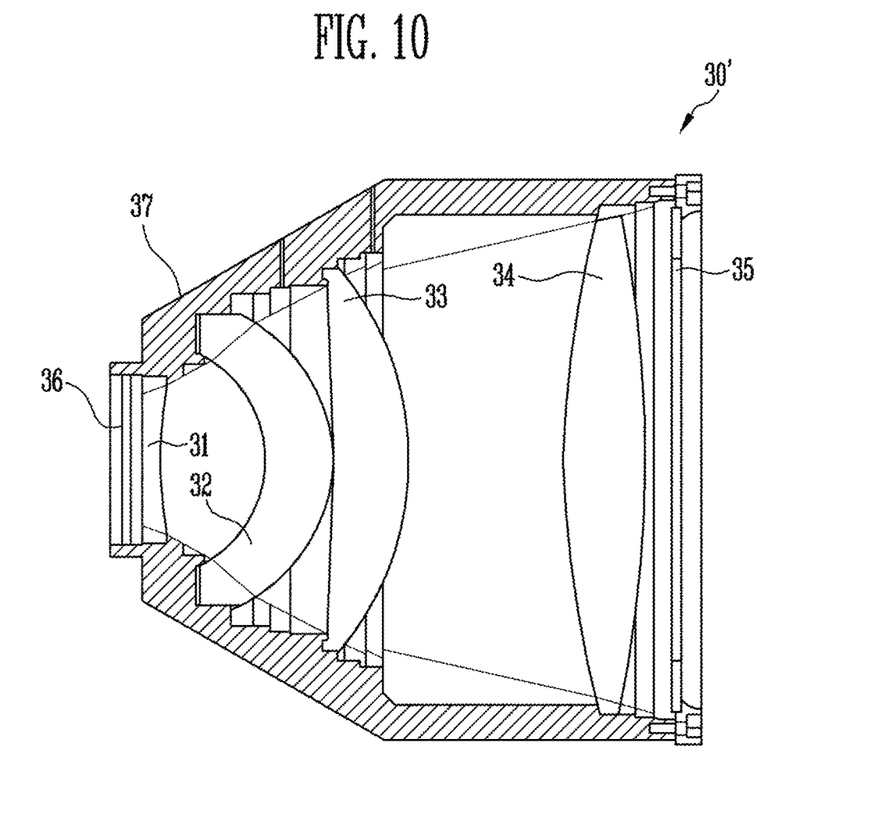
FIG. 10 illustrates a cross-sectional view of a mechanical design structure of an embodiment of the F-theta lens shown in FIGS. 3 and 4.

FIG. 10 illustrates a cross-sectional view of a mechanical design structure of an embodiment of the F-theta lens shown in FIGS. 3 and 4. The same or like elements shown in FIG. 10 have been labeled with the same reference characters as used above to describe embodiments of the F-theta lens described above, and any repetitive detailed description thereof will be omitted.

Referring to FIG. 10, an embodiment of the F-theta lens 30' may include a housing 37 and optical elements disposed or mounted in the housing 37. The optical elements may include the diffractive optical element 36, the first to fourth lenses 31 to 34, and the protection window 35 that are sequentially arranged along the direction in which a laser beam passes.

In such an embodiment, the diffractive optical element 36 may be a diffractive optical element having three or more levels, for example, the 8-level diffractive optical element. In such an embodiment, the ratio of the focal length $f_{DOE}$ of the diffractive optical element 36 to the focal length $f_{F\text{-}theta}$ of the F-theta lens 30' may be set or designed to 1.5 or greater.

In one embodiment, for example, the respective ratios of the respective focal lengths $f_{DOE}$, $f_1$, $f_2$, $f_3$, and $f_4$ of the diffractive optical element 36 and the first to fourth lenses 31 to 34 with respect to the focal length $f_{F\text{-}theta}$ of the F-theta lens 30' may satisfy the following equations (1) through (5) with a tolerance of 5%:

$$f_{DOE}/f_{F\text{-}theta} = 2.1 \quad (1)$$

$$f_1/f_{F\text{-}theta} = -1.76 \quad (2)$$

$$f_2/f_{F\text{-}theta} = -3.44 \quad (3)$$

$$f_3/f_{F\text{-}theta} = 1.46 \quad (4), \text{ and}$$

$$f_4/f_{F\text{-}theta} = 2.09 \quad (5).$$

In the above equations, $f_{DOE}$ denotes the focal length of the diffractive optical element 36, $f_{F\text{-}theta}$ denotes the focal length of the F-theta lens 30', $f_1$ denotes the focal length of the first lens 31, $f_2$ denotes the focal length of the second lens 32, $f_3$ denotes the focal length of the third lens 33, and $f_4$ denotes the focal length of the fourth lens 34.

According to an embodiment, the curvature radius, thickness, distance between adjacent elements, constituent material, and radius of each of the optical elements (e.g., the diffractive optical element 36, the first to fourth lenses 31 to 34, and/or the protection window 35) of the F-theta lens 30' and the substrate 40 may be set or designed as shown in Table 1 below. However, Table 1 merely shows design values according to an embodiment, which may be changed or modified.

TABLE 1

| Element | Radius (Front/ Back surfaces) [mm] | Thickness/ Distance [mm] | Material | Semi-Diameter [mm] |
|---|---|---|---|---|
| DOE | Infinity/Infinity | 1.5 | F_SILICA | 30 |
| (SPACE) | — | 1 | — | 29.47055153 |
| LENS1 | Infinity/182.74 | 8 | F_SILICA | 33 |
| (SPACE) | — | 45.53 | — | 33 |
| LENS2 | −50.55/−69.82 | 29 | F_SILICA | 43 |
| (SPACE) | — | 0.47 | — | 60 |
| LENS3 | 1132.66/−134.55 | 32 | F_SILICA | 80 |
| (SPACE) | — | 67 | — | 80 |
| LENS4 | 358.34/−528.63 | 35 | F_SILICA | 104 |
| (SPACE) | — | 5 | — | 104 |
| Window | Infinity/Infinity | 4 | F_SILICA | 104 |
| (SPACE) | — | 210.1512 | — | 104 |
| Substrate (Focal Plane) | Infinity | — | — | 97.42371047 |

In Table 1, DOE denotes the diffractive optical element 36; LENS1, LENS2, LENS3, and LENS4 respectively denote the first lens 31, the second lens 32, the third lens 33 and the fourth lens 34, respectively, Window denotes the protection window 35, Substrate denotes the substrate 40 to be processed, in particular, the focal plane of the substrate 40, and F_SILICA denotes fused silica.

According to an embodiment, with respect to the 2-level diffractive optical element, the specifications of the 2-level diffractive optical element may be set or designed as shown in Table 2 below. Table 2 shows specifications based on Zemax, which is a kind of optical equipment simulator, and the numerical unit is millimeter (mm).

TABLE 2

| Type | BINARY_2 |
|---|---|
| Radius | Infinity |
| Thickness | 1.5 |
| Material | F_SILICA |
| Clear Aperture | 58.8904575 |
| Conic | 0 |
| Maximum Term # | 6 |
| Norm Radius | 20 |
| Coeff. on p^2 | −8069.74517 |
| Coeff. on p^4 | 2.665977176 |
| Coeff. on p^6 | 30.94859108 |
| Coeff. on p^8 | −27.45945803 |
| Coeff. on p^10 | 8.693360854 |
| Coeff. on p^12 | −0.919737163 |

The coefficients in Table 2 represent polynomial phase profiles as in Equation 2 below.

$$\Phi = M \sum_{i=1}^{N} A_i \rho^{2i} \quad \text{[Equation 2]}$$

In Equation 2, N denotes the number of polynomial coefficients, Ai denotes the coefficient on 2i-th power of ρ, which is the normalized radial aperture coordinate, and M denotes the diffraction order.

Table 2 merely shows design values and the like of one exemplary embodiment of the diffractive optical element 36, and the invention is not limited thereto. In embodiments of the invention, the design numerical values of the diffractive optical element 36 may be variously changed or modified.

According to embodiments of the invention, the F-theta lens and the optical system including the F-theta lens includes the diffractive optical element disposed as a first element in front of the spherical lenses, such that the chromatic aberration caused by the femtosecond laser beam is corrected and the femtosecond laser beam is focused at a diffraction limited spot with high accuracy, while constructing the F-theta lens with a relatively simple structure. In such embodiments, the efficiency of the diffractive optical element is improved by constructing the diffractive optical element as a multi-level diffractive optical element having three or more levels.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. An F-theta lens comprising:
a diffractive optical element; and
a plurality of spherical lenses,
wherein
the diffractive optical element includes a multi-level diffractive structure having three or more levels and defined on a surface thereof,
the diffractive optical element is arranged before the spherical lenses on a path of a laser beam, and
the spherical lenses comprise a first lens which is a plano-concave lens and adjacent to the diffractive optical element.

2. The F-theta lens of claim 1, wherein each of the diffractive optical element and the spherical lenses includes fused silica.

3. The F-theta lens of claim 1, wherein
the diffractive optical element includes a front surface and a rear surface, each of which is a plane surface, and
the diffractive structure is defined on the rear surface.

4. The F-theta lens of claim 1, wherein the diffractive structure has an axisymmetric structure including a plurality of rings.

5. The F-theta lens of claim 1, wherein the diffractive structure is an 8-level diffractive structure.

6. The F-theta lens of claim 1, wherein a ratio of a focal length of the diffractive optical element to a focal length of the F-theta lens is 1.5 or greater.

7. The F-theta lens of claim 1, wherein the spherical lenses further comprise:
a second lens which is a meniscus lens;
a third lens which is a concave-convex lens; and
a fourth lens which is a convex-convex lens, and
wherein the first to fourth lenses are sequentially arranged after the diffractive optical element on the path of the laser beam.

8. The F-theta lens of claim 7, wherein respective ratios of respective focal lengths of the diffractive optical element and the first to fourth lenses with respect to a focal length of the F-theta lens satisfy, with a tolerance of 5%, the following conditions:

$f_{DOE}/f_{F\text{-}theta}=2.1$;

$f_1/f_{F\text{-}theta}=-1.76$;

$f_2/f_{F\text{-}theta}=-3.44$;

$f_3/f_{F\text{-}theta}=1.46$; and $f_4/f_{F\text{-}theta}=2.09$, wherein $f_{DOE}$ denotes a focal length of the diffractive optical element, $f_{F\text{-}theta}$ denotes the focal length of the F-theta lens, $f_1$ denotes a focal length of the first lens, $f_2$ denotes a focal length of the second lens, $f_3$ denotes a focal length of the third lens, and $f_4$ denotes a focal length of the fourth lens.

9. An optical system comprising:
a laser generator which emits a laser beam;
a scanner which adjusts a direction in which the laser beam is directed; and
an F-theta lens including a diffractive optical element and a plurality of spherical lenses sequentially arranged after the scanner on a path of the laser beam,
wherein the diffractive optical element includes a multi-level diffractive structure having three or more levels and defined on a surface thereof, and
the spherical lenses comprise a first lens which is a plano-concave lens and adjacent to the diffractive optical element.

10. The optical system of claim 9, wherein each of the diffractive optical element and the spherical lenses includes fused silica.

11. The optical system of claim 9, wherein
the diffractive optical element includes a front surface and a rear surface, each of which is a plane surface, and
the diffractive structure is defined on the rear surface.

12. The optical system of claim 9, wherein the diffractive structure has an axisymmetric structure including a plurality of rings.

13. The optical system of claim 9, wherein the diffractive structure is an 8-level diffractive structure.

14. The optical system of claim 9, wherein a ratio of a focal length of the diffractive optical element to a focal length of the F-theta lens is 1.5 or greater.

15. The optical system of claim 9, wherein the spherical lenses further comprise:
a second lens which is a meniscus lens;
a third lens which is a concave-convex lens; and
a fourth lens which is a convex-convex lens, and
wherein the first to fourth lenses are sequentially arranged after the diffractive optical element on the path of the laser beam.

16. The optical system of claim 15, wherein respective ratios of respective focal lengths of the diffractive optical element and the first to fourth lenses with respect to a focal length of the F-theta lens satisfy, with a tolerance of 5%, the following conditions:

$f_{DOE}/f_{F\text{-}theta}=2.1$;

$f_1/f_{F\text{-}theta}=-1.76$;

$f_2/f_{F\text{-}theta}=-3.44$;

$f_3/f_{F\text{-}theta}=1.46$; and $f_4/f_{F\text{-}theta}=2.09$, wherein $f_{DOE}$ denotes the focal length of the diffractive optical element, $f_{F\text{-}theta}$ denotes the focal length of the F-theta lens, $f_1$ denotes a focal length of the first lens, $f_2$ denotes a focal length of the second lens, $f_3$ denotes a focal length of the third lens, and $f_4$ denotes a focal length of the fourth lens.

\* \* \* \* \*